US010076950B2

(12) United States Patent
Usui et al.

(10) Patent No.: US 10,076,950 B2
(45) Date of Patent: Sep. 18, 2018

(54) DOOR STRUCTURE OF VEHICLE

(71) Applicant: HONDA MOTOR CO., LTD., Tokyo (JP)

(72) Inventors: Takanori Usui, Wako (JP); Osamu Kobayashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/449,390

(22) Filed: Mar. 3, 2017

(65) Prior Publication Data
US 2017/0253111 A1 Sep. 7, 2017

(30) Foreign Application Priority Data

Mar. 4, 2016 (JP) ................................ 2016-042804

(51) Int. Cl.
B60J 5/04 (2006.01)
B60R 1/06 (2006.01)
B60J 10/80 (2016.01)

(52) U.S. Cl.
CPC ........... B60J 5/0404 (2013.01); B60J 5/0429 (2013.01); B60J 5/0436 (2013.01); B60J 5/0437 (2013.01); B60J 10/80 (2016.02); B60R 1/06 (2013.01)

(58) Field of Classification Search
CPC .......... B60R 1/06; B60J 5/0404; B60J 5/0436
USPC ....................... 296/146.5–146.6, 152, 29, 30
See application file for complete search history.

(56) References Cited

U.S. PATENT DOCUMENTS

| 4,700,959 | A | * | 10/1987 | Lars | B62B 3/00 108/56.1 |
| 5,181,687 | A | * | 1/1993 | Kerper | B60R 1/06 248/479 |
| 8,132,845 | B2 | * | 3/2012 | Kinoshita | B60J 5/0425 248/475.1 |
| 8,727,420 | B2 | * | 5/2014 | Yasuhara | B60J 5/0426 296/146.5 |
| 9,016,747 | B2 | * | 4/2015 | Kuroki | B60J 5/0429 296/1.11 |
| 9,102,218 | B2 | * | 8/2015 | Yasuhara | B60J 5/0426 |
| 9,669,762 | B2 | * | 6/2017 | Pearson | B60R 1/06 |
| 2010/0019533 | A1 | * | 1/2010 | Kinoshita | B60J 5/0425 296/146.6 |

(Continued)

FOREIGN PATENT DOCUMENTS

JP 11-105627 A 4/1999
JP 2002-219938 A 8/2002

(Continued)

OTHER PUBLICATIONS

Office Action dated Nov. 14, 2017, issued in counterpart Japanese Application No. 2016-042804, with English machine translation. (6 pages).

Primary Examiner — Dennis H Pedder
(74) Attorney, Agent, or Firm — Westerman, Hattori, Daniels & Adrian, LLP

(57) ABSTRACT

A front side door 2 has an inner panel 12 and an outer panel disposed on an outer side than the inner panel 12 in a vehicle width direction. A door mirror is disposed on the vehicle exterior side of the outer panel, and a base member 30 is disposed on the vehicle interior side of the door mirror with the outer panel interposed therebetween, the door mirror being mounted to the base member. The base member 30 is joined to the inner panel 12.

4 Claims, 7 Drawing Sheets

(56) References Cited

U.S. PATENT DOCUMENTS

2015/0138658 A1* 5/2015 Nishimura ............... B60R 1/06
359/871

FOREIGN PATENT DOCUMENTS

| JP | 2014-97714 A | 5/2014 | | |
|----|--------------|--------|---|---|
| JP | 2014-231246 A | 12/2014 | | |
| WO | WO-9623676 A1 * | 8/1996 | ............... | B60R 1/06 |

* cited by examiner

DOOR STRUCTURE OF VEHICLE

CROSS-REFERENCE OF RELATED APPLICATION

This application claims priority of Japanese Patent Application No. 2016-042804 filed in Japan on Mar. 4, 2016, the entire contents of which are incorporated herein by reference.

TECHNICAL FIELD

The present invention relates to a door structure of a vehicle.

BACKGROUND OF THE INVENTION

Conventionally, there is a vehicle having a door to which a door mirror is mounted. As such a vehicle, for example, there is a vehicle equipped with a mounting structure of a door mirror in which a door mirror reinforcement with a door mirror mounted thereto is provided inside a door and the door mirror reinforcement is connected to a plurality of reinforcing members via a connecting member (for example, see Japanese Laid-open Patent Publication No. 2014-97714). With this door mirror mounting structure, while securing good visibility on a front side of a driver due to the rear arrangement of the door mirror, it is possible to improve the safety at the time of a side collision using the arrangement of the door mirror, without providing a dedicated door reinforcing member.

SUMMARY OF INVENTION

However, in the mounting structure of the door mirror disclosed in the above-mentioned Patent Document 1, the door mirror reinforcement is connected to a belt line reinforcement and a load pass pipe. Usually, since the door mirrors are installed in a direction away from a vehicle body to the outside of a vehicle width direction to exert their functions, the load of the door mirror (exterior member) is applied to the door mirror reinforcement by the distance away from the vehicle body, and thus high mounting rigidity is required.

An object of the present invention is to provide a door structure of a vehicle capable of supporting an exterior member with high mounting rigidity.

(1) In order to solve the above problem, according to an aspect of the present invention, there is provided a door structure of a vehicle, including a door (for example, a front side door 2 of an embodiment) which opens and closes an opening (for example, a front side opening of an embodiment) formed in a vehicle body (for example, a vehicle body 1A of an embodiment) wherein the door has an inner panel (for example, an inner panel 12 of an embodiment), and an outer panel (for example, an outer panel 11 of an embodiment) disposed on an outer side than the inner panel in a vehicle width direction, an exterior member (for example, a door mirror 4 of an embodiment) is disposed on the vehicle exterior side of the outer panel, and a base member (for example, a base member 30 of an embodiment) is disposed on the vehicle interior side of the exterior member with the outer panel interposed therebetween, the exterior member being mounted to the base member, and the base member is joined to the inner panel.

(2) Furthermore, in the door structure of a vehicle according to an aspect of the preset invention, the base member may include a first base member (for example, a first base member 31 of an embodiment), a patch member (for example, a patch member 33 of an embodiment) disposed between the first base member and the inner panel, and the patch member may be disposed at a position overlapping the first base member, when viewed in the vehicle width direction, and the patch member and the inner panel may be joined by an elastic member (for example, an elastic member 40 of an embodiment).

(3) Furthermore, in the door structure of a vehicle according to an aspect of the preset invention, a reinforcing member (for example, a reinforcing member 21 of an embodiment) extending in a front-rear direction may be disposed on an inner side surface of the outer panel in the vehicle width direction, and a surface of the reinforcing member on the outer panel side may be in contact with the outer panel, and the base member may be joined to the reinforcing member at a second joining point (for example, a second joining point 52 of an embodiment) different from a first joining point (for example, a first joining point 51 of an embodiment), with a joining point between the base member and the inner panel as the first joining point.

(4) Furthermore, in the door structure of a vehicle according to an aspect of the preset invention, the base member may be joined to the reinforcing member at an inner position in the vehicle width direction than a surface of the reinforcing member to be joined to the outer panel (for example, an abutment surface 21A of an embodiment).

(5) Furthermore, in the door structure of a vehicle according to an aspect of the preset invention, a connecting member (for example, a connecting member 13 of an embodiment) configured to connect the inner panel and the outer panel may be provided, the base member may further include an elongated second base member which has one end portion (for example, a rear end portion 32B of an embodiment) joined to the door and the other end portion (for example, a front end portion 32A of an embodiment) joined to the first base member, the base member may be joined to the door at a third joining point (for example, a third joining point 53 of an embodiment) at the other end portion of the second base member, and the base member may be joined to the connecting member at a fourth joining point (for example, a fourth joining point 54 of an embodiment) on the inner side in the vehicle width direction than the first joining point.

(6) Furthermore, in the door structure of a vehicle according to an aspect of the preset invention, one of the first joining point, the second joining point, the third joining point and the fourth joining point may be disposed at a position deviated from a plane (for example, a plane 60S of an embodiment) on which the other three joining points are located.

Effect of the Invention

According to the above configuration of (1), the base member to which the exterior member is joined is mounted to the inner panel. Therefore, it is possible to dispose the joining portion of the base member to extend in a wide range with respect to the vehicle width direction. Thus, since the mounting rigidity of the base member to the door can be enhanced, it is possible to support the exterior member with high mounting rigidity.

According to the above configuration of (2), the patch member is disposed at a position overlapping the first base member when viewed in the vehicle width direction, and the patch member and the inner panel are joined to each other by an elastic member. Therefore, even if the base member has a complicated shape, since it is possible to prevent the base member from becoming an obstacle to securement of a space and an accuracy of a welding jig or the like when mounted to the inner panel, it is possible to easily mount the base member.

According to the above configuration of (3), a surface of the reinforcing member on the side of the outer panel is in contact with the outer panel, and the base member is joined to the outer panel. Therefore, the load applied to the exterior member can be cooperatively received by the outer panel and can be dispersed to the outer panel. Further, the base member is joined to the reinforcing member at the second joining point different from the first joining point, with the joining point between the base member and the inner panel as the first joining point. Therefore, the rigidity of the base member can be further enhanced.

According to the above configuration of (4), since the base member is joined at the inner position in the vehicle width direction than the surface of the reinforcing member to be joined to the outer panel, the base member extends in the vehicle width direction. Therefore, the mounting rigidity of the base member can be increased. Further, it is possible to form an integral unit with the outer panel and the base member, and the unit can be mounted to the inner panel. Therefore, it is possible to reduce the man-hour required when manufacturing the door.

According to the above configuration of (5), the base member is joined to the inner panel and the outer panel, and the base member is joined to the door at the other end portion of the second base member, and is jointed to the connecting member in the inner portion in the vehicle width direction than the first joining point. Therefore, since the base member is joined to the door at two positions of the first joining point and the third joining point offset in the vehicle width direction, and two positions of the first joining point and the fourth joining point offset in the front-rear direction, it is possible to enhance the mounting rigidity in both the vehicle width direction and the front-rear direction.

According to the above configuration of (6), one of the four joining points is disposed at a position deviated from the plane including the other three joining points. For example, when the number of joining points is three or less, all the joining points are included on the same plane, and the yield strength against a force applied from a direction orthogonal to the plane including the joining points decreases. In this respect, by disposing one of the four joining points at a position deviated from the plane including the other three joining points, it is possible to suppress a decrease in yield strength depending on the direction.

DETAILED DESCRIPTION OF THE INVENTION

Hereinafter, an embodiment of the present invention will be described with reference to the drawings. In the following description, unless otherwise specified, terms such as "front", "rear", "top" and "bottom" refer to "front", "rear", "top" and "bottom" for vehicles.

Figure 1:
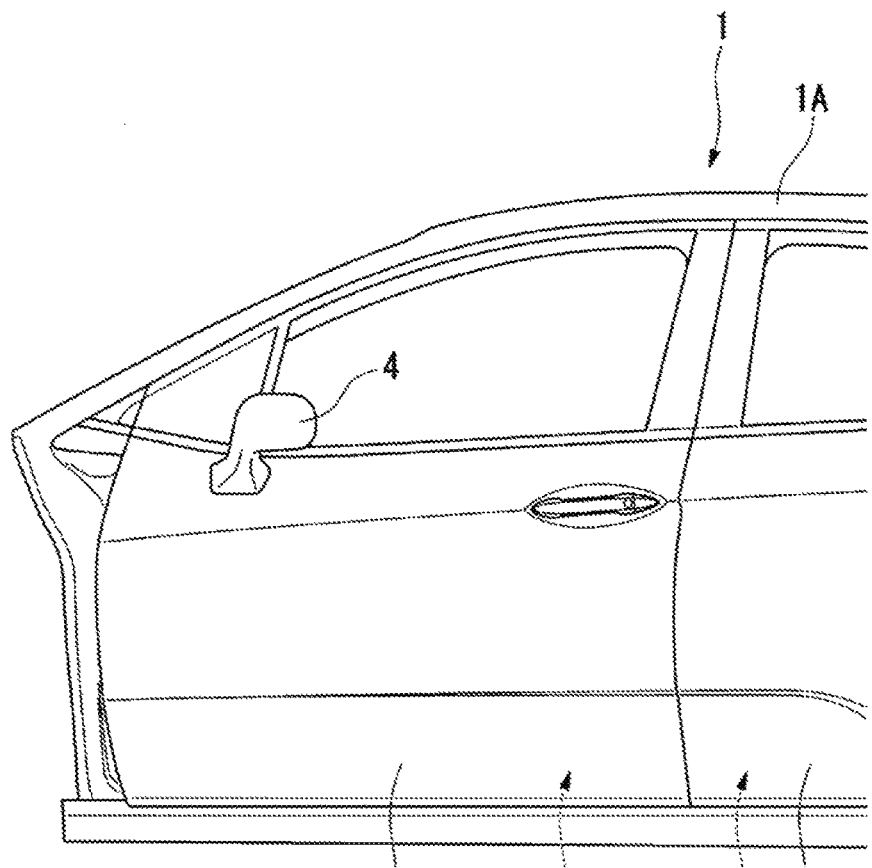
FIG. 1 is a side view of a vehicle to which a door structure according to an embodiment of the present invention is applied.
Figure 1:
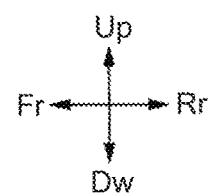
Figure 2:
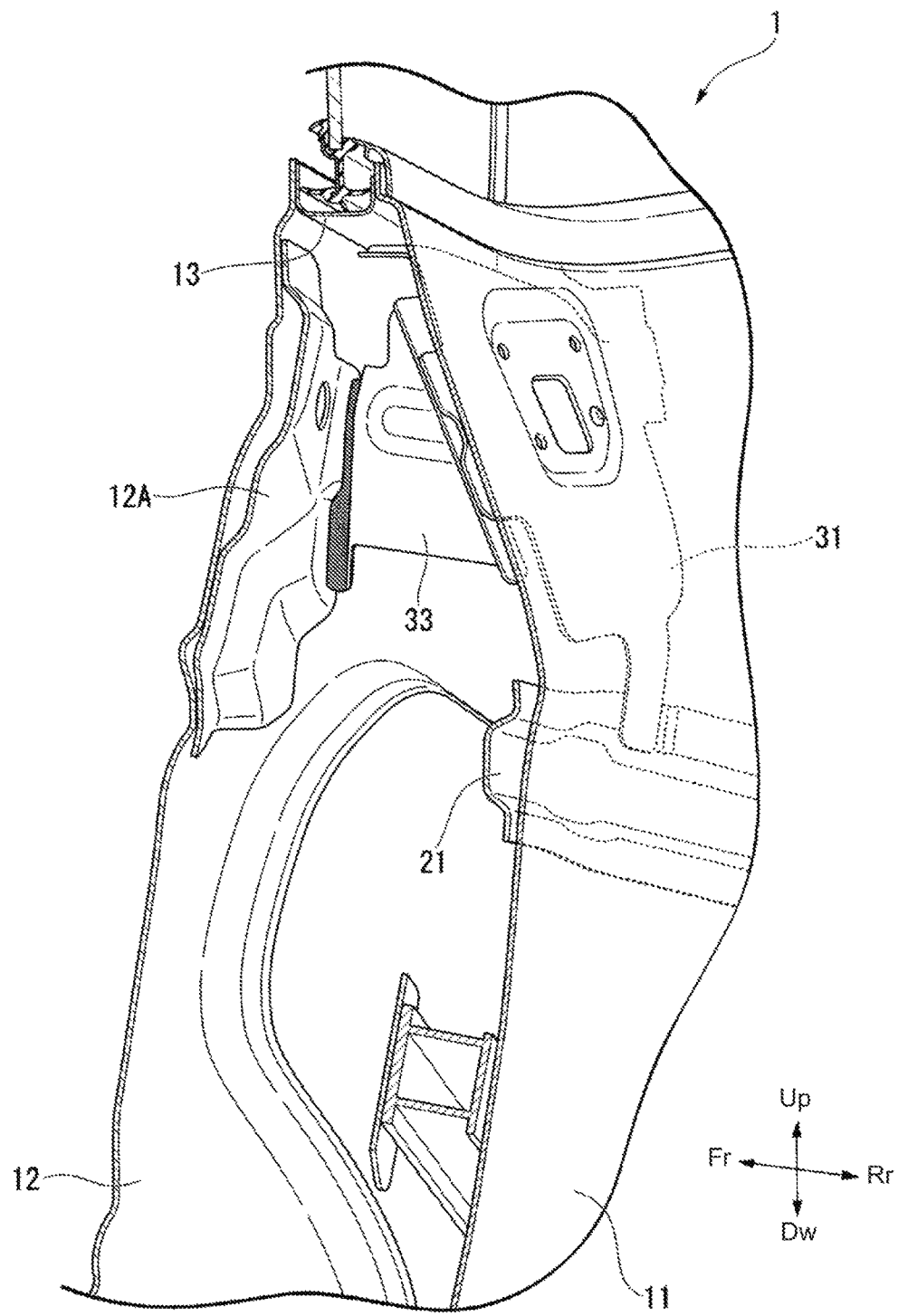
FIG. 2 is a front sectional view of the door structure of the vehicle.
Figure 3:
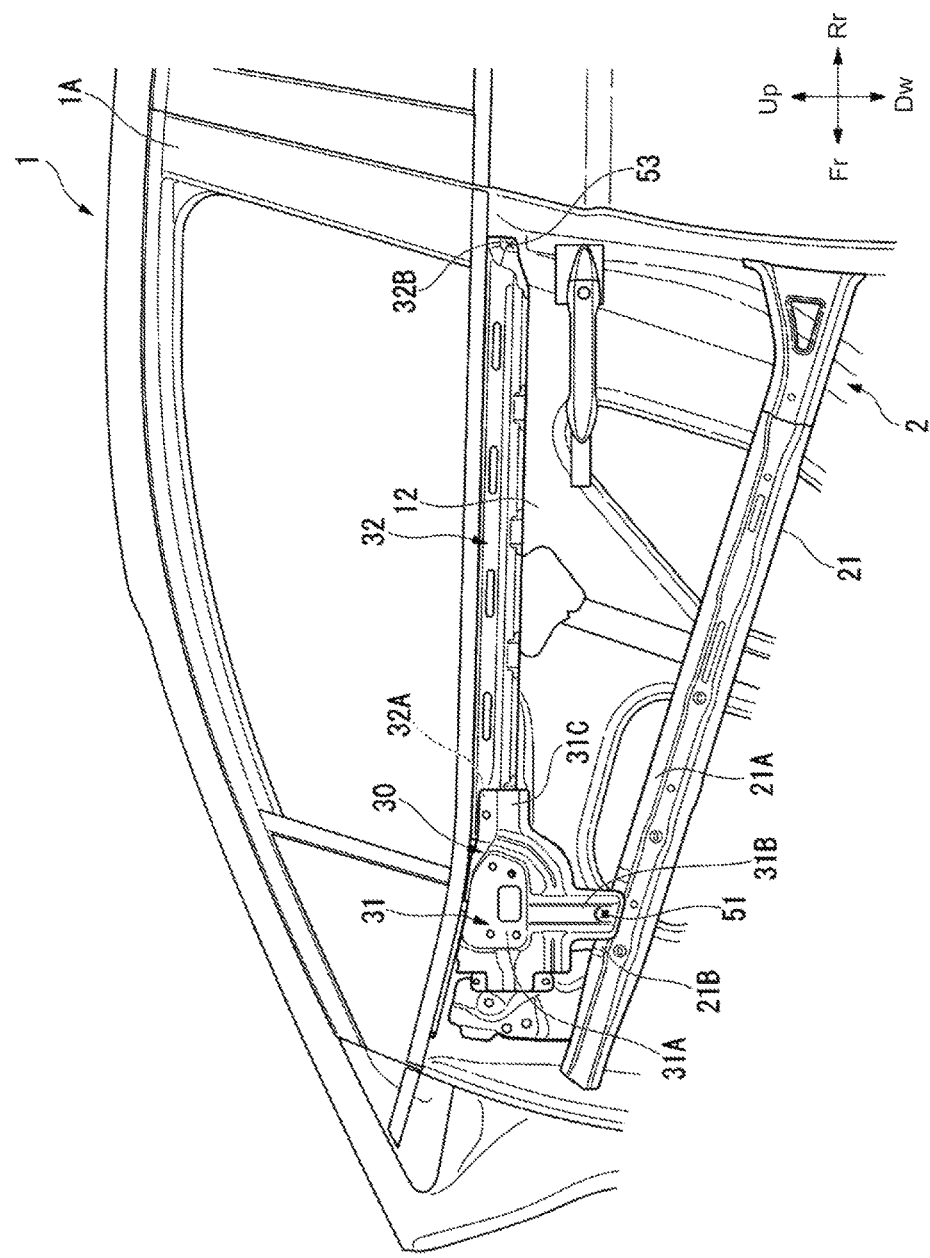
FIG. 3 is a side view of the door structure of the vehicle with an outer panel removed.
Figure 4:
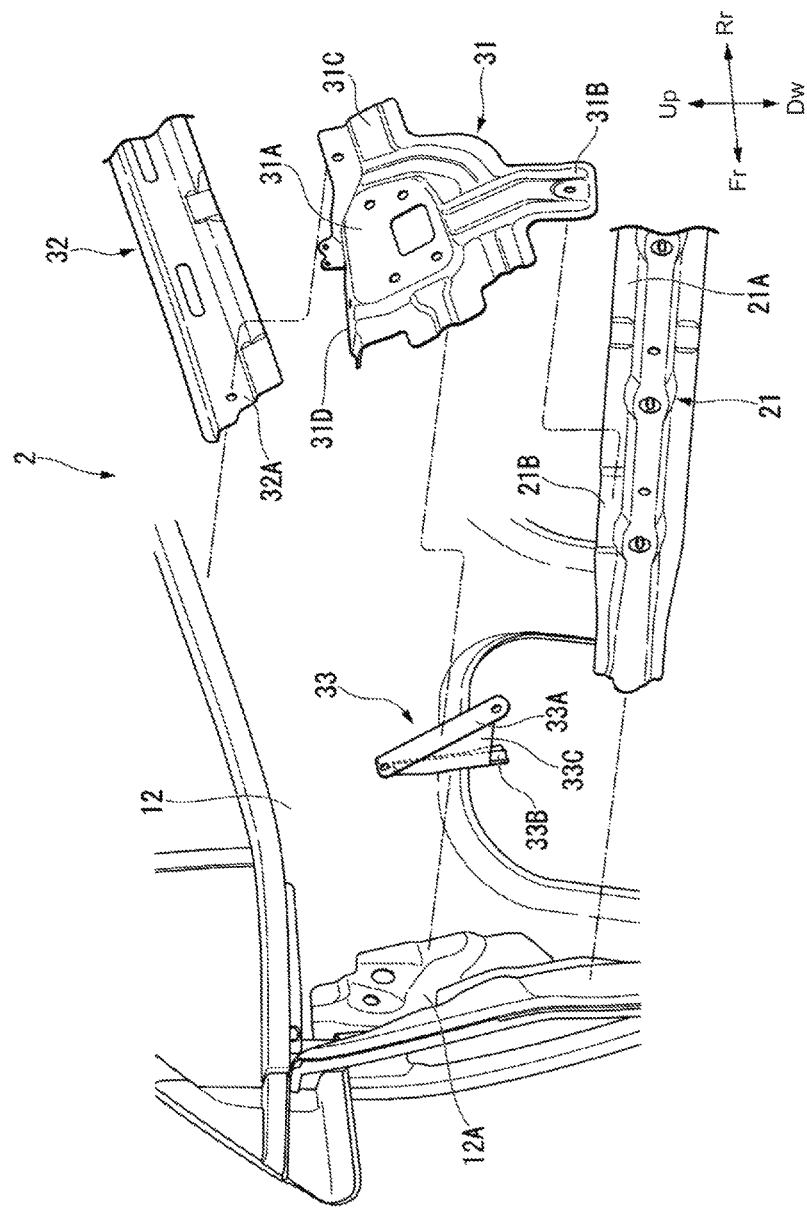
FIG. 4 is an exploded perspective view of a main part of the door structure of the vehicle.
Figure 5:
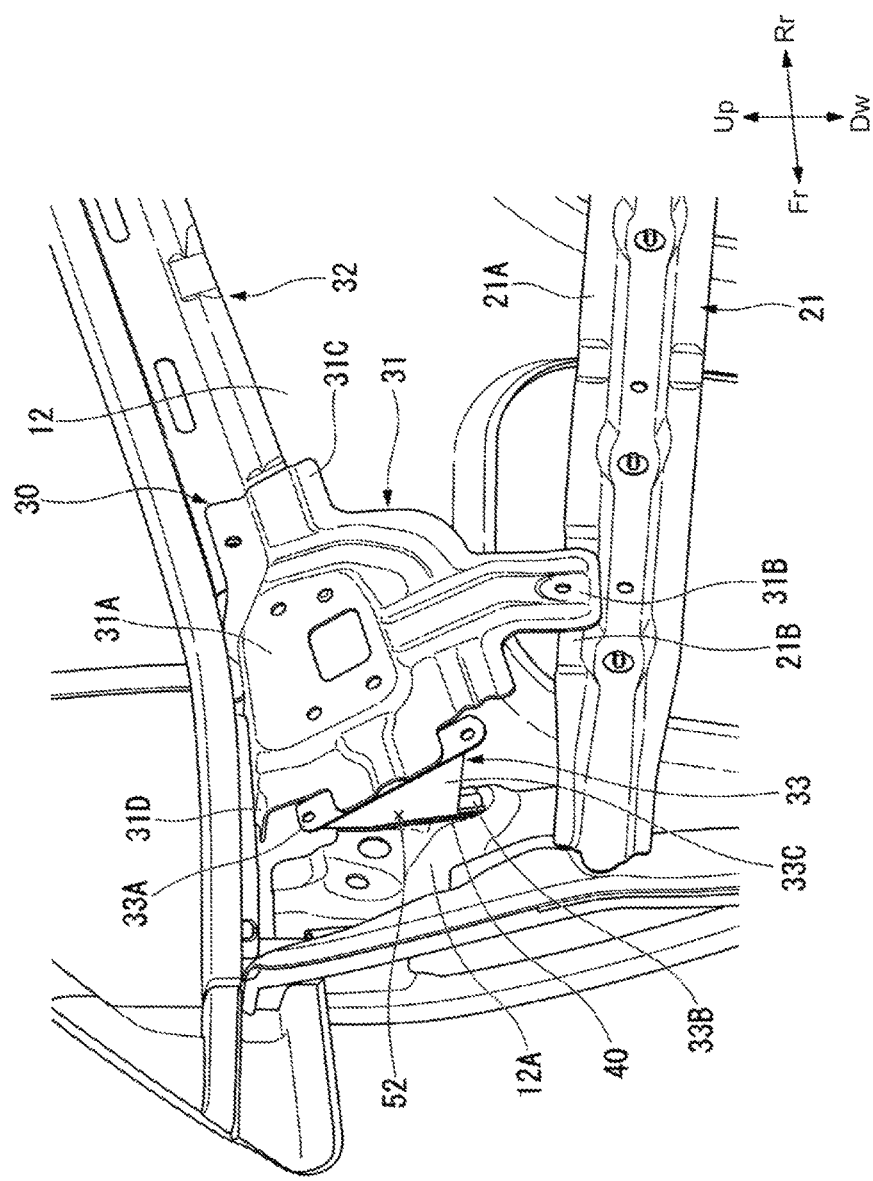
FIG. 5 is a perspective view of a main part of the door structure of the vehicle.

FIG. 1 is a side view of a vehicle to which a door structure according to an embodiment of the present invention is applied. FIG. 2 is a front sectional view of the door structure of the vehicle. FIG. 3 is a side view of the door structure of the vehicle with an outer panel removed. FIG. 4 is an exploded perspective view of a main part of the door structure of the vehicle. FIG. 5 is a perspective view of a main part of the door structure of the vehicle. As illustrated in FIG. 1, a vehicle 1 according to an embodiment includes a vehicle body 1A, and a front side opening and a rear side opening are formed in the vehicle body 1A. The front side opening is closed by a front side door 2, and the front side door 2 opens and closes the front side opening.

The rear side opening is disposed behind the front side opening of the vehicle body 1A, the rear side opening is closed by a rear side door, and the rear side door opens and closes the rear side opening 1C. On the front side door 2, a door mirror 4 as an exterior member is disposed. The metal part of the vehicle 1 including the front side door 2 is made of a lightweight nonferrous metal, e.g., aluminum. However, a part or the whole thereof may be made of a metal such as iron other than aluminum.

As illustrated in FIG. 2, the front side door 2 includes an outer panel 11 and an inner panel 12, and the outer panel 11 is disposed on the outer side in the vehicle width direction than the inner panel 12. Further, the door mirror 4 illustrated in FIG. 1 is disposed on the vehicle exterior side of the outer panel 11. The upper end portion of the outer panel 11 and the upper end portion of the inner panel 12 are connected to each other via a connecting member 13.

A reinforcing member 21 provided on the inner panel 12 is disposed on the inner side surface of the outer panel 11 in the vehicle width direction. The reinforcing member 21 is an elongated member extending along the front-rear direction of the vehicle and is provided over substantially the entire region of the inner panel 12 in the front-rear direction. Further, the surface of the reinforcing member 21 on the side of the outer panel 11 is in contact with the outer panel 11 over substantially the entire region.

A base member 30 is provided above the front end portion of the reinforcing member 21. The base member 30 is disposed on the vehicle interior side of the door mirror 4 with the outer panel 11 interposed therebetween, and the door mirror 4 is mounted thereto. As illustrated in FIGS. 3 to 5, the base member 30 is configured to include a first base member 31 and a second base member 32.

Further, as illustrated in FIGS. 4 and 5, the base member 30 includes a patch member 33 which is disposed inside the first base member 31 in the vehicle width direction. The patch member 33 is disposed at a position overlapping the first base member 31 of the base member 30 when viewed in the vehicle width direction. The first base member 31 is disposed in front of the upper end side of the front side door 2. Further, the second base member 32 has an elongated shape, and the second base member 32 is disposed such that the longitudinal direction thereof extends along the upper end side of the front side door 2.

As illustrated in FIG. 4, the first base member 31 of the base member 30 is configured to include a first base member main body 31A, a lower leg portion 31B, a lateral leg portion 31C, and a back plate portion 31D. The first base member main body 31A is a substantially rectangular plate-like member, and the lower leg portion 31B is a narrow member extending downward from the first base member main body 31A. The lateral leg portion 31C is a narrow member extending rearward from the first base member main body 31A, and the back plate portion 31D is a plate-like member extending inward in the vehicle width direction from the first base member main body 31A.

The first base member main body 31A is disposed at a position away from the inner panel 12. The surface formed by the inner panel 12 and the surface formed by the first base member main body 31A are in an inclined positional relation. The patch member 33 is interposed between the first base member main body 31A and the inner panel 12.

The patch member 33 includes a first plate portion 33A joined to the first base member 31, and a second plate portion 33B joined to the inner panel 12. Further, the patch member 33 includes a connecting portion 33C that connects the first plate portion 33A and the second plate portion 33B. All of the first plate portion 33A, the second plate portion 33B, and the connecting portion 33C have a plate shape.

The first plate portion 33A is configured to include a surface that is substantially parallel to the surface famed by the first base member main body 31A of the first base member 31. Further, the second plate portion 33B is configured to include a surface inclined with respect to the first plate portion 33A. The connecting portion 33C is configured to include a surface which is substantially orthogonal to an axis substantially orthogonal to both of an axis substantially orthogonal to the surface famed by the first base member 31 and an axis substantially orthogonal to the surface famed by the second base member 32.

The first plate portion 33A of the patch member 33 is welded and joined to the first base member main body 31A of the first base member 31. Further, the second plate portion 33B is joined to the inner panel 12. At the time of joining the second plate portion 33B and the inner panel 12, an inner panel joining portion 12A, which is the joining portion of the inner panel 12 to which the second plate portion 33B is joined, has an uneven shape.

An elastic member 40 having adhesiveness such as a seal is interposed between the second plate portion 33B and the inner panel joining portion 12A, and the patch member 33 and the inner panel 12 are joined by the elastic member 40. The elastic member 40 is a member that has flexibility and can be deformed to follow the unevenness of the inner panel joining portion 12A. Therefore, even if the inner panel joining portion 12A has a complicated shape such as an uneven shape, the second plate portion 33B can be joined. The base member 30 is joined to the inner panel 12 via the patch member 33, and the joining point between the second plate portion 33B and the inner panel joining portion 12A is a first joining point 51 between the base member 30 and the inner panel 12.

The lower end portion of the lower leg portion 31B of the first base member 31 is joined to the reinforcing member 21. The reinforcing member 21 is formed with an abutment surface 21A and a joining recess 21B which are brought into contact with the outer panel 11. The joining recess 21B is slightly recessed inward in the vehicle width direction from the abutment surface 21A. The lower leg portion 31B of the first base member 31 is joined to the reinforcing member 21 via an elastic member (not illustrated) in the joining recess 21B. Therefore, the lower leg portion 31B of the first base member 31 is joined to the reinforcing member 21 at an inner position in the vehicle width direction than the abutment surface 21A of the reinforcing member 21 which is a surface to be joined to the outer panel 11. The joining point between the lower leg portion 31B in the first base member 31 and the reinforcing member 21 is a second joining point 52 different from the first joining point 51. The lateral leg portion 31C of the first base member 31 is joined to the front end portion 32A which is the other end portion of the second base member 32 by bolt joining. Although the lateral leg portion 31C of the first base member 31 and the front end portion 32A of the second base member 32 are joined with bolts by multiple point striking, spot joining may be performed instead of the bolt joining.

The second base member 32 of the base member 30 has a front end portion 32A to which the lower leg portion 31B of the first base member is connected, and a rear end portion 32B as one end portion which is welded and joined to the inner panel 12. The joining point between the second base member 32 and the inner panel 12 is a third joining point 53. The rear end portion 32B of the second base member 32 may be joined to a door chassis when the door chassis is provided. Further, the rear end portion 32B of the second base member 32 and the inner panel 12 may be joined with rivet instead of welding, or when the door chassis is provided, the rear end portion 32B of the second base member 32, the inner panel 12 and the door chassis may be joined together.

Figure 6:
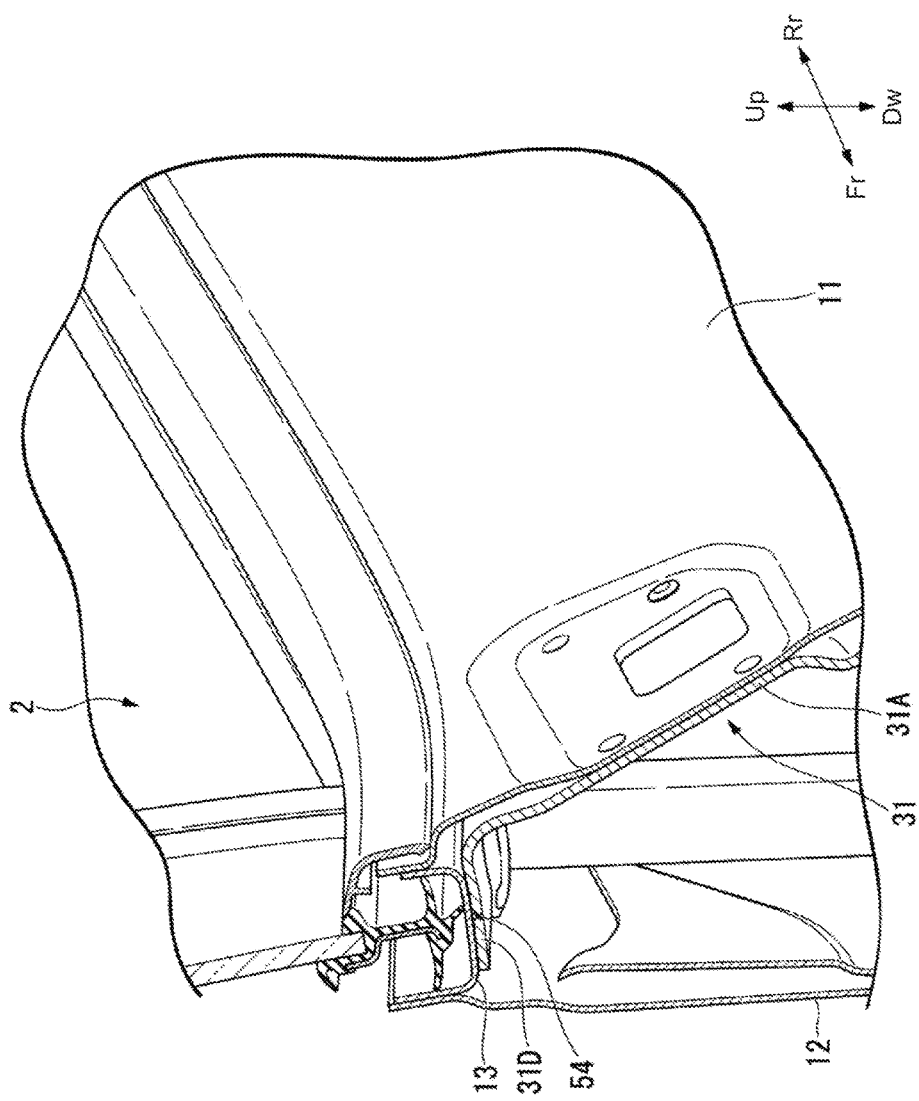
FIG. 6 is an explanatory diagram illustrating a fourth joining point of a base member.

Further, as illustrated in FIG. 6, the back plate portion 31D of the first base member 31 extends inward in the vehicle width direction, and extends to the lower surface side of the connecting member 13 interposed between the outer panel 11 and the inner panel 12. The back plate portion 31D is joined to the connecting member 13 by welding. The joining point between the back plate portion 31D and the connecting member 13 serves as a fourth joining point 54. Thus, the base member 30 is joined to the inner panel 12 at the four joining points of the first joining point 51 to the fourth joining point 54.

As illustrated in FIG. 2, assuming that the positions of the first joining point 51 and the second joining point 52 are reference positions, the third joining point 53 is set as a position that is offset in the front-rear direction with respect to the reference position. Further, as illustrated in FIG. 6, the fourth joining point 54 is set as a position that is offset in the vehicle width direction with respect to the reference position.

In the vehicle door structure according to this embodiment having the above configuration, the base member 30, to which the door mirror 4 is joined, is mounted to the inner panel 12. Therefore, it is possible to dispose the first joining point 51 to the fourth joining point 54 of the base member 30 to extend in a wide range with respect to the vehicle width direction. Thus, since it is possible to enhance the mounting rigidity of the base member 30 with respect to the front side door 2, the door mirror 4 can be supported with high mounting rigidity.

Further, the patch member 33 of the base member 30 is disposed at a position overlapping the first base member 31 when viewed in the vehicle width direction, and the patch member 33 and the inner panel 12 are joined to each other by the elastic member 40. In general, since the patch member 33 is a small-sized component, its shape is relatively freely defined. However, since the inner panel 12 is a large-sized component, its shape is restricted. Therefore, by making the uneven shape of the joining surface of the patch member 33 with the inner panel 12 close to the uneven shape of the surface of the inner panel 12 to connect the patch member 33 and the inner panel 12 via the elastic member 40, the patch member 33 can be easily joined to the inner panel 12. Thus, it is possible to easily mount the base member 30.

Further, the base member 30 is joined to the reinforcing member 21 that comes into contact with the outer panel 11. Therefore, it is possible to receive the load applied to the door mirror 4 cooperatively with the inner panel 12 by the outer panel 11, and to disperse the load to the outer panel 11 in addition to the inner panel 12. Thus, it is possible to further enhance the mounting rigidity of the base member 30 with respect to the front side door 2.

Further, since the base member 30 is joined at the inner position in the vehicle width direction than the surface of the reinforcing member 21 joined to the outer panel 11, the base member extends in the vehicle width direction. Therefore, it is possible to enhance the mounting rigidity of the base member 30 with respect to the front side door 2. Further, it is also possible to form an integral unit with the outer panel 11 and the base member 30 and to mount the unit to the inner panel 12. Therefore, it is possible to reduce the man-hour required when manufacturing the front side door 2.

Further, the base member 30 is joined to the front side door 2 at the first joining point 51 and the second joining point 52, and is also joined to the front side door 2 at the third joining point 53 and the fourth joining point 54, even in the rear end portion of the front side door 2 and the inner portion of the first joining point 51, respectively. Therefore, the base member 30 is joined to the side door 2 at two positions of the first joining point 51 and the third joining point offset in the vehicle width direction, and the two positions of the first joining point and the fourth joining point offset in the front-rear direction. Thus, it is possible to enhance the mounting rigidity in both the vehicle width direction and the front-rear direction.

Figure 7:
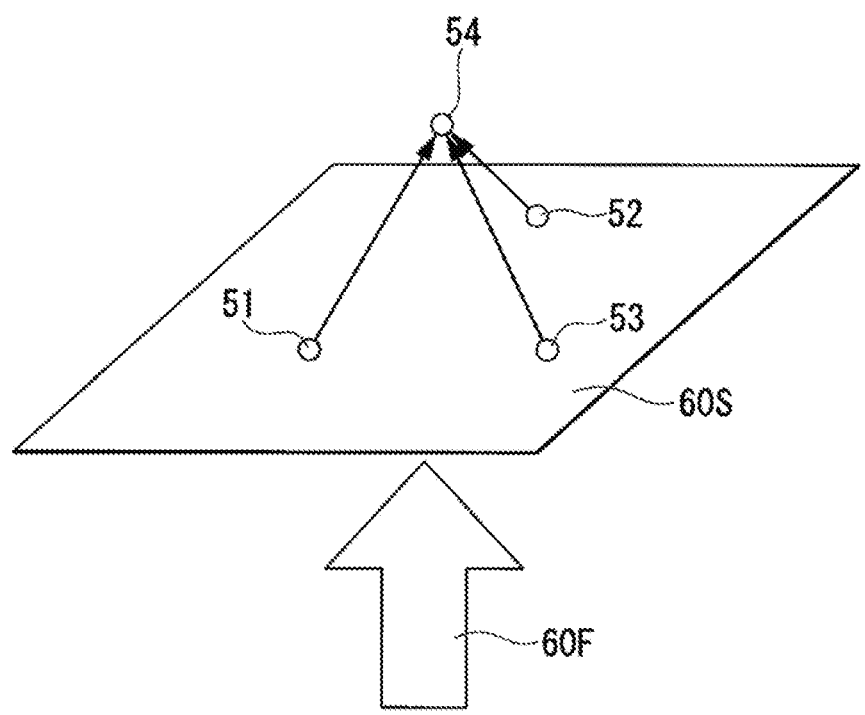
FIG. 7 is an explanatory diagram schematically illustrating a positional relation between a first joining point and a fourth joining point.

Further, one of the first joining point 51 to the fourth joining point 54 as the four joining points, for example, the fourth joining point 54 is disposed at a position deviated from the plane including other three joining points, for example, the first joining point 51 to the third joining point 53. When the number of the joining points is three or less, all the joining points are included on the same plane, and the yield strength against a force applied from a direction orthogonal to the plane including the joining points decreases. In this respect, as schematically illustrated in FIG. 7, the fourth joining point 54, which is one of the first joining point 51 to the fourth joining point 54 as the four joining points, is located at a position deviated from a plane 60S including the first joining point 51 to the third joining point 53.

For example, when the base member 30 is joined at the first joining point 51 to the third joining point 53, high yield strength is exerted with respect to a direction other than the direction orthogonal to the plane 60S including the first joining point 51 to the third joining point 53. In contrast, the physical strength with respect to a load 60F decreases in a direction orthogonal to the plane 60S. Therefore, by providing the fourth joining point 54 at a position deviated from the plane 60S, it is possible to enhance the physical strength in the direction orthogonal to the plane 60S. Thus, it is possible to suppress a decrease in yield strength depending on direction.

The present invention is not limited to the above-described embodiment, and various design changes can be made within the scope that does not depart from the gist thereof. For example, the members may be joined by welding in place of the respective joining portions to which bolts/nuts are fastened and joined. Further, bolts, nuts or rivets may be fastened and joined, instead of each welded joining portion.

DESCRIPTION OF REFERENCE NUMERALS 1 vehicle
1A vehicle body
1B front opening
1C rear opening
2 front side door
3 rear side door
4 door mirror
11 outer panel
12 inner panel
12A inner panel joining portion
13 connecting member
21 reinforcing member
21A abutment surface
21B joining recess
30 base member
31 first base member
31A first base member main body
31B lower leg portion
31C lateral leg portion
31D back plate portion
32 second base member
32A front end portion
32B rear end portion
33 patch member
33A first plate portion
33B second plate portion
33C connecting portion
40 elastic member
51 first joining point
52 second joining point
53 third joining point
54 fourth joining point
60F load
60S plane

The invention claimed is:
1. A door structure of a vehicle comprising a door configured to open and close an opening formed in a vehicle body, the door structure comprising:
an inner panel of the door;
an outer panel of the door disposed on an outer side of said inner panel in a vehicle width direction;
an exterior member disposed on a vehicle exterior side of said outer panel; and
a base member disposed on the vehicle interior side of said exterior member such that said outer panel is interposed between said base member and said exterior member, said exterior member being mounted to the base member, wherein
said base member is joined to said inner panel,
said base member and said inner panel are joined to each other at a first joining point,
the door structure further comprises a reinforcing member that extends in a front-rear direction and is disposed on an inner side surface of said outer panel in the vehicle width direction such that a first surface of said reinforcing member on said outer panel side abuts said outer panel, said base member is joined to said reinforcing member at a second joining point different from said first joining point, and said base member is joined to a second surface of said reinforcing member on said outer panel side thereof at an inner position in the vehicle width direction than said first surface of said reinforcing member that is joined to said outer panel.

2. The door structure of the vehicle according to claim 1, wherein said base member comprises a first base member and a patch member disposed between said first base member and said inner panel, said patch member being disposed at a position overlapping said first base member in a view of the vehicle width direction, and wherein said patch member and said inner panel are joined by an elastic member such that said base member is joined to said inner panel via said patch member and said elastic member.

3. A door structure of a vehicle comprising a door configured to open and close an opening formed in a vehicle body, the door structure comprising:

an inner panel of the door;

an outer panel of the door disposed on an outer side of said inner panel in a vehicle width direction;

an exterior member disposed on a vehicle exterior side of said outer panel; and a base member disposed on the vehicle interior side of said exterior member such that said outer panel is interposed between said base member and said exterior member, said exterior member being mounted to the base member, wherein said base member is joined to said inner panel, said base member comprises a first base member and a patch member disposed between said first base member and said inner panel, said patch member being disposed at a position overlapping said first base member in a view of the vehicle width direction, said patch member and said inner panel are joined by an elastic member such that said base member is joined to said inner panel via said patch member and said elastic member, said base member and said inner panel are joined to each other at a first joining point, the door structure further comprises a reinforcing member that extends in a front-rear direction and is disposed on an inner side surface of said outer panel in the vehicle width direction such that a surface of said reinforcing member on said outer panel side abuts said outer panel, said base member is joined to said reinforcing member at a second joining point different from said first joining point, and said base member is joined to said reinforcing member at an inner position in the vehicle width direction than said surface of said reinforcing member that is joined to said outer panel, the door structure further comprising:

a connecting member configured to connect said inner panel and said outer panel, wherein said base member further comprises an elongated second base member which has one end portion joined to said door and another end portion joined to said first base member, said base member is joined to said door at a third joining point at said another end portion of said second base member, and the base member is joined to said connecting member at a fourth joining point on the inner side in the vehicle width direction than said first joining point.

4. The door structure of the vehicle according to claim 3, wherein any one of said first joining point, said second joining point, said third joining point and said fourth joining point is disposed at a position deviated from a plane on which the other three joining points are located.

* * * * *